United States Patent

[11] 3,610,266

| [72] | Inventor | August Rudle<br>Stuttgart-Bad Cannstatt, Germany |
|---|---|---|
| [21] | Appl. No. | 853,364 |
| [22] | Filed | Aug. 27, 1969 |
| [45] | Patented | Oct. 5, 1971 |
| [73] | Assignee | Bizerba-Werke Wilhelm Kraut KG.<br>Wilhelm Kraut-Str., Balingen,<br>Wurttemberg, Germany |
| [32] | Priority | Aug. 29, 1968 |
| [33] | | Germany |
| [31] | | P 17 82 418.9 |

[54] PRESSURE FLUID CONTROL DEVICE
4 Claims, 4 Drawing Figs.

| [52] | U.S. Cl. | 137/81.5 |
|---|---|---|
| [51] | Int. Cl. | F15c 3/02,<br>F15c 3/04 |
| [50] | Field of Search | 137/81.5,<br>625.66; 91/3 |

[56] References Cited

UNITED STATES PATENTS

| 3,124,999 | 3/1964 | Woodward | 137/81.5 X |
|---|---|---|---|
| 3,176,920 | 4/1965 | Severson | 137/81.5 X |
| 3,225,780 | 12/1965 | Warren et al. | 137/81.5 |
| 3,280,832 | 10/1966 | Burns | 137/81.5 X |
| 3,367,367 | 2/1968 | Moriyama et al. | 137/625.66 X |
| 3,420,255 | 1/1969 | Wilkerson | 137/81.5 |
| 3,444,877 | 5/1969 | Atchley | 137/81.5 |
| 3,472,225 | 10/1969 | Burns | 137/81.5 X |
| 3,477,344 | 11/1969 | Fisher | 137/625.66 X |
| 3,492,920 | 2/1970 | Czajkowski et al. | 137/81.5 X |

*Primary Examiner*—Samuel Scott
*Attorney*—Christen and Sabol

ABSTRACT: The fluid supplied to a double-acting pneumatically operated reciprocating element is led through a control device which includes a jet nozzle directing the pressure fluid alternatively to a pair of angularly related channels, and back pressure from reciprocating element is directed into the path of the jet stream to assist in guiding it into the proper channel.

3,610,266

PRESSURE FLUID CONTROL DEVICE

The invention concerns a control device for an element that is driven reciprocatingly by actuation of a pressure medium, especially for the control piston in the pulsator of a milking machine.

It is known to reverse periodically the direction of the pressure medium to be supplied to a reciprocatingly driven element, e.g., the control piston in the pulsator of a milking machine from one side to the opposite side of the driven element by means of a mechanical distributing slide valve. The mechanical slide valve is however expensive to manufacture and is as movable parts subject to considerable wear.

The invention addresses itself to proposing a simple, immovable control device for an element driven reciprocatingly by the force of a pressure medium, especially for the control piston in the pulsator of a milking machine.

The problem is solved according to the invention in that the pressure medium through a nozzle into the alternating effect chamber of a jet channel element from which two channels separated by a wedge and provided with relief passages branch off, one of which leads to the driven element and on actuation of this element causes a backup of the pressure medium for switching and stabilization of the flow in the alternating effect chamber.

Jet channel elements are known per se (for example from Austrian Pat. No. 249,413), but as a rule they serve as logical switching elements or flow amplifiers and not as control devices in the sense of the invention, which is based on the idea of using backed up or ejected pressure medium for switching or stabilization of the flow in the alternating effect chamber of the element.

In the preferred embodiment of a control device according to the invention it is provided, that a channel leads to one side and another channel leads to the other side of a driven element and that on actuation of one side of the element the pressure medium ejected from the other side is conveyed back to stabilize the flow in the alternating effect chamber.

In another embodiment of the invention the jet channel element is asymmetrically formed and acts periodically only on one side of the driven element which is biassed with a recovery force, whereby the latter is pretensioned in one direction of motion by a stored force, such as a spring. It is furthermore advantageous if the movement of the driven element is limited at least in one direction by an adjustable stop.

The following description of a preferred embodiment of the invention together with the attached drawing serves for further explanation. In the drawing.

The invention is described in the following with references to a milking machine pulsator, but it is not limited to this use however, and is basically suited for all elements, such as pistons, membranes and the like, that are reciprocally driven through actuation by a hydraulic or pneumatic pressure medium.

Figure 1:
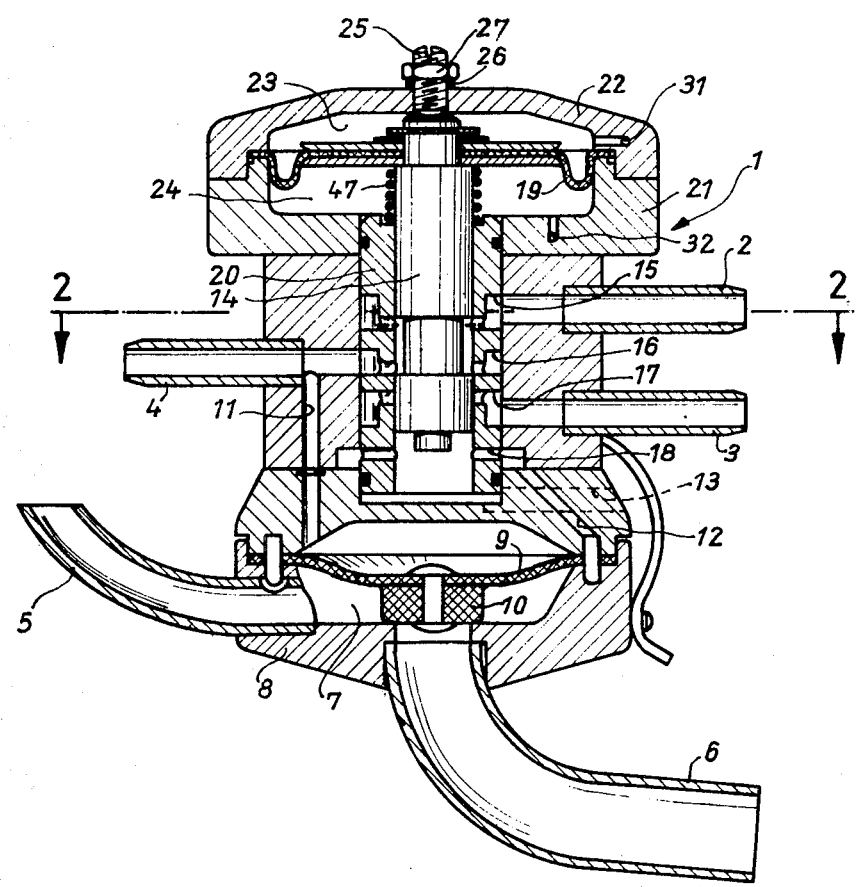
FIG. 1 shows a sectional view of a milking machine pulsator with reciprocatingly driven control pistons.

In the milking machine pulsator of FIG. 1, hose nipples 2, 3, 4, 5, and 6 are disposed on a multiple part housing 1. Hose nipple 2 is permanently connected with a pressure source, usually a compressed air source, while nipple 3 is permanently connected with a vacuum pipe. Hose nipples 4 and 5 are connected via hose lines and a teat cup with the udder of a cow to be milked. In operating the pulsators the line leading from hose nipple 4 is in a known manner subjected alternatingly to pressure and vacuum while the line connected with hose nipple 5 is subjected alternatingly to vacuum and atmospheric pressure. The milk drawn from the udder flows via hose nipple 5 into a milk collecting chamber 7 disposed inside a detachable bottom part 8 of the housing and flows from there via a line connected with nipple 6 and constantly subjected to vacuum, into a milk collecting vessel.

In a milk collecting chamber 7 there is disposed an elastic membrane 9, which carries an elastic valve body 10. The upper side of the membrane 9, which is on the opposite side from the valve body 10, is permanently connected via a channel 11 with nipple 4 and is thus acted on alternatingly by pressure and vacuum, so that the valve body 10 periodically seats itself on the mouth of the nipple 6 in the milk collecting chamber 7 to form a seal or is lifted from this mouth. When the valve body 10 is lifted off, the milk collecting chamber 7 is subjected to vacuum via the milk collecting line connected with hose nipple 6, while when the valve body 10 is seated on the mouth atmospheric pressure prevails in the milk collecting chamber via two channels 12, 13 provided in the housing 1.

The periodic impingement described above of the individual lines connected with the hose nipples 2–6 with vacuum, compressed air, and atmospheric pressure is controlled by a control piston 14, which is slidable in a bushing 20 disposed in the housing 1 and provided with a plurality of control passages 15, 16, 17 and 18. This piston is reciprocatingly driven by a pressure medium. The invention has to do only with the control of the drive of the reciprocating control piston 14. The control functions performed by control piston 14 itself and also the periodical closing and opening of the control passage 15–18 is disclosed and claimed in the applicant's copending application entitled, PULSATOR OPERATED VALVE FOR MILKING MACHINES, filed Aug. 14, 1969, with Ser. No. 849,970 and needed therefore not to be described in detail.

As appears from FIG. 1, a flexible membrane is fixedly and tightly connected with the upper end of the control piston 14, by means of plates and washers, the said membrane having its edge clamped between an upper part 21 and a cover 22 of the housing 1 to form a seal. The membrane 19 divides a space formed in the upper part 21 and the cover 22 into the two chambers 23 and 24. In the cover 22 a stop in the form of a screw 25 is provided, on which a sealing ring 26 and a nut 27 are disposed. Through suitable adjustment of the depth of the screw 25 the height of lift of the control piston 14 upward can be limited. An analogous device, not shown, can also be provided for the adjustable limitation downward of the height of the lift.

For the reciprocating drive of the control piston, a pressure medium, preferably compressed air, is introduced alternatingly into the chambers 23 and 24 by means well known in the art. The introduction takes place via ducts 31 and 32 respectively, provided in the housing 1, of which ducts only the outlets into the chambers 23 and 24 respectively are visible in the drawing (FIG. 1).

Figure 2:
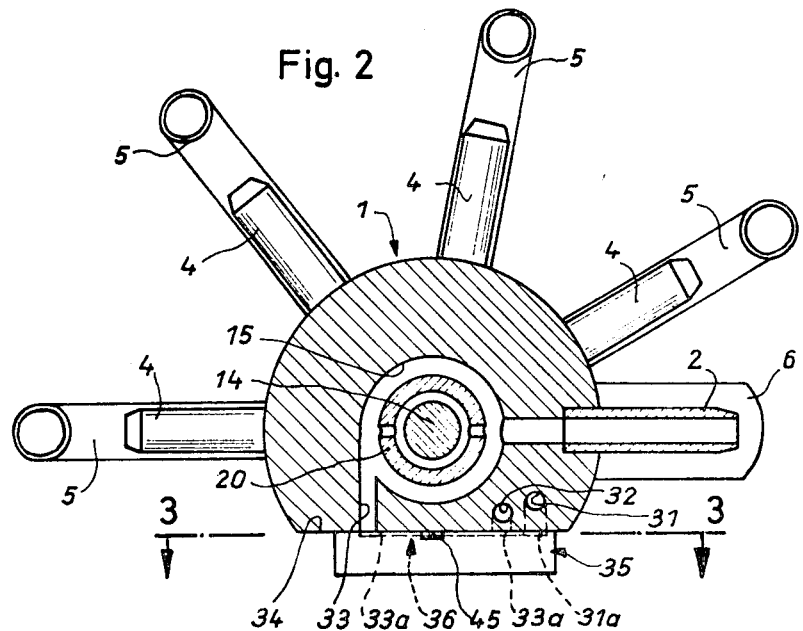
FIG. 2 shows a sectional view along line 2—2 in FIG. 1.

As appears from FIG. 2, the control passage 15 which is permanently connected via hose nipple 2 with a compressed air source is connected with a channel 33 which joins it tangentially and which at 33a opens on a straight sidewall 34 of the housing 1. The ducts 31 and 32, coming from chambers 23 and 24, as already mentioned in connection with FIG. 1, also open on sidewall 34. This represented by dashed lines in FIG. 2 at 31a and 32a respectively.

On the straight sidewall 34 of the housing 1 lying closely against it a so-called jet channel element 35 is attached with screws (not shown). The element 35 is in the form of a rectangular plate, for example of plastic, the inner surface that is turned against the wall 34 a canal system 36 as represented in plan view in FIG. 3, for example 1 mm. deep, is hollowed out by milling, etching or the like. As appears from FIG. 3, the canal system 36 consists of an intake canal 37 and two outlet canals 38 and 39, which are separated from each other by a wedge 41. The intake canal 37 discharges via a nozzle 42 into an alternating effect chamber 43 from which the two outlet canals 38 and 39 branch off. Furthermore, two relief passages 44 and 45, which are connected with the atmosphere at the edge of the plate 35, also open into the alternating effect chamber 43. The plate-shaped element 35 is attached to the sidewall 34 of the housing 1 in such manner that the channel 33 which is connected with the compressed air source opens into the intake channel 37 at 33a and the channels 38, 39 are connected at 31a and 32a respectively with the openings of ducts 31 and 32 which are represented by dashed lines in FIG. 2.

The jet channel element operates as follows: The compressed air entering the intake canal 37 at 33a arrives in the alternating effect chamber 43 through the nozzle 42 in the form of a jet. As a result of a boundary layer effect known per se in fluid amplifiers, this jet adheres to one or the other sidewall of the alternating effect chamber 43, so that it penetrates only into one or the other of the channels 38 or 39. It is assumed that the compressed air jet will first adhere to the sidewall of the alternating effect chamber 43 that is on top in FIG. 3 and therefore will enter channel 38, which is connected at 31a with the duct 31 in housing 1. Through this duct 31 (see FIG. 1) the compressed air enters chamber 23, acts on the membrane 19 and moves the control piston 14 connected with it downward. Thereby the volume of chamber 24 is reduced and the air expelled thereby arrives via duct 32 at 32a in channel 39 of the jet channel element and is partially expelled via relief passage 45 into the atmosphere. The rest of the pressure medium entering through channel 39 in this way acts on the compressed air jet directed from nozzle 42 into channel 38 and stabilizes in in such manner, that it continues to adhere firmly to the upper sidewall of the alternating effect chamber 43 in FIG. 3 and continues to penetrate into channel 38 exclusively.

When the control piston 14 has reached its lower terminal position there developes in the chamber 23 and in the duct 31 connected with it a backup of compressed air, which also transmits itself via channel 38 into the alternating effect chamber 43, because no more air is ejected from chamber 24. This cancels the stabilization effect with the result that the jet issuing from the nozzle 42 now swings down from duct 38 to duct 39 and thereby adheres to the lower wall of the alternating effect chamber 43 in FIG. 3 and enters exclusively through the duct 32 into the housing 1, which is connected at 32a with channel 39, and into the chamber 24, which is situated below the membrane 19. In chamber 24 the compressed air acts on the underside of the membrane and lifts the same together with the control piston 14 upward, whereby the pressure agent expelled from the now diminishing chamber 23 penetrates at 31a via duct 31 into channel 38 and a part escapes through relief passage 44 into the atmosphere. Thereby this ejected pressure medium on passing through the alternating effect chamber 43 again stabilizes the jet of pressure medium issuing from nozzle 42 and now directed exclusively into channel 39. As soon as control piston 14 again has reached its upper terminal position, a backup occurs, which again directs the jet into channel 38 and so forth. In this way the self-switching and stabilizing jet channel element 35 functions as a control device for the reciprocating drive of the control piston 14.

Figure 3:
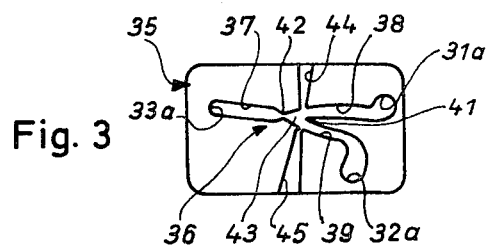
FIG. 3 shows a view in elevation on the line 3—3 in FIG. 2; of a wall jet element used according to the invention.
Figure 4:
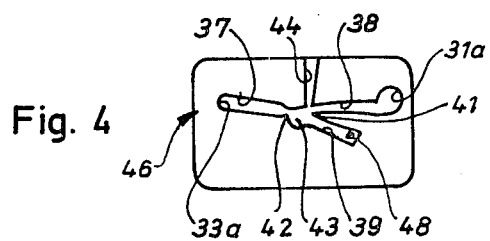
FIG. 4 shows a view similar to that of FIG. 3, but of a modified wall jet element according to the invention.

A modified jet channel element 46 is represented in elevation in FIG. 4, which according to the invention likewise can serve as a control device in place of the jet channel element 35 of FIG. 3. When using element 46 it is necessary however, to urge the lifting of the control piston 14 in one direction by means of a biassing return force. For this purpose a helical spring 47 is shown in FIG. 1, which at one end bears against the bushing 20 and at the other end against a plate underlying the membrane 19 and thereby forces the control piston 14 into its upper terminal position. In this case the pressure medium is only fed into the upper chamber 23 to move the control piston periodically downward, while the upwardly directed force on the membrane 19 is exercised by the helical spring 47 to move the control piston upward. In this embodiment the compressed air fed into the chamber 23 must of course overcome the force of the spring 47.

The jet channel element 46 represented in FIG. 4 is asymmetrically shaped and differs from the element 36 of FIG. 3 in that the relief passage 45 is omitted and the duct 32 which opens into the chamber 24 situated below the membrane 19 does not open into the element 46, but leads into the atmosphere at some other location, whereby the constant connection of duct 32 with the atmosphere serves the purpose of bringing about an air equalization in chamber 24 through the working of membrane 19. As further appears from FIG. 4, the asymmetry of the element 46 is also expressed in that the alternative effect chamber 43 in this case bulges out somewhat at the wall that is turned toward channel 39. Finally, channel 39, in FIG. 4 is made shorter than in FIG. 3 and has a direct connection to the atmosphere in the form of a hole 48 passing through the plate-shaped element 46.

The element 46 working in connection with the above-mentioned spring 47 operates as follows: The compressed air entering through hose nipple 2 (FIG. 2) into the passage 15 arrives via channel 33 at 33a into the intake channel 37 of element 46. From the intake channel 37 the compressed air issues from the nozzle 42 in the form of a jet into the alternating effect chamber 43. Because of the symmetrical shape of the alternating effect chamber 43 the jet always adheres to the straight wall of the alternating effect chamber 43, which wall is on top in FIG. 4 and thus enters channel 38 and from there, via duct 31 which is connected at 31a, into chamber 23 which is situated above membrane 19, where an excess pressure is now generated which moves the membrane and with it the control piston 14 downward against the force of the spring 47. As soon as the piston 14 has arrived at its lower terminal position, whereby the air is ejected from chamber 24 through duct 32, and discharges into the open, a back pressure transmits itself from chamber 23 through duct 31 into channel 38 and has the effect that the jet issuing from nozzle 42 is deflected and directed into channel 39, where the compressed air it carries escapes through the hole 48 into the atmosphere. In this phase, when chamber 23 is no longer acted upon by compressed air, the spring 47 will move the piston 14 upward into the terminal position shown in FIG. 1. The air which is thereby forced out of chamber 23 via duct 31 into channel 38 is used to stabilize the jet issuing from the nozzle 42 and to direct it into channel 39 and from there into the open. But as soon as the piston 14 has reached its upper terminal position and no more air flows through channel 38, the jet from the nozzle 42 resumes its normal position in which it adheres to the upper wall of the alternative effect chamber 43 and enters channel 38, so that the above-described cycle now begins again.

In FIG. 1 a helical spring 47 is shown as the return force in combination with the wall jet element 46 of FIG. 4. Instead of this spring a pressure medium tightly enclosed in chamber 24 can be used to achieve the same function, being compressed when chamber 23 is acted upon by pressure medium and subsequently again expanding. In this case the duct 32 is of course sealed to the atmosphere or omitted entirely. The spring 47 can also be used in combination with jet channel element 35, if for any reason the movement of the control piston 14 is to be given additional bias in the lifting direction. The adjustable stop limiting the height of movement in one or both directions, namely the screw 25 in FIG. 1 has, among other things the purpose of providing optimum adaption of the pulsating movement of the control piston 14 to a particular jet channel element.

I claim:

1. In milking machine pulsators of the type wherein a control piston is mounted for reciprocatory movement, the combination including a housing provided with a hollow interior having a movable element therein defining with said hollow interior a pair of opposing expansible chambers, said element being to reciprocate said control piston in response to the alternative admission of fluid into said expansible chambers, a control member provided with a plurality of internal channels and an alternating effect chamber therein, one of said channels being adapted for connection with a source of fluid under pressure and terminating in a nozzle directing said fluid into the alternating effect chamber, a second and a third channel each having one end in communication with the alternating effect chamber to receive fluid directed into said chamber by said nozzle and having a common wedge-shaped dividing wall, the respective other ends of said second and third channels being connected with a respective one of said pair of expansible chambers, and outlet means communicating with said alternating effect chamber to expel excess fluid to the atmosphere, said expansible chambers being in communication with the alternating effect chamber only through said respective channels, whereby fluid flowing back through a channel from a contacting and contracted expansible chamber directs fluid admitted by the nozzle into the other channel to expand the other expansible chamber.

2. The invention as defined in claim 1, wherein said outlet means comprises fourth and fifth channels in said control member, all of said channels being disposed generally in the same plane, one end of said fourth and fifth channels terminating in the alternating effect chamber between said nozzle and the wedge-shaped dividing wall and respectively at opposite sides of the path of fluid admitted by the nozzle.

3. The invention as defined in claim 1, wherein said housing includes adjustable stop means to limit the reciprocatory movement of said control piston.

4. The invention as defined in claim 1, wherein said housing includes spring means connected with said movable element defining the expansible chambers to urge movement of said element in one direction.